(12) United States Patent
Jones

(10) Patent No.: US 6,868,960 B2
(45) Date of Patent: Mar. 22, 2005

(54) CONVEYING APPARATUS

(75) Inventor: Peter T. Jones, Kennewick, WA (US)

(73) Assignee: Key Technology, Inc., Walla Walla, WA (US)

( * ) Notice: Subject to any disclaimer, the term of this patent is extended or adjusted under 35 U.S.C. 154(b) by 77 days.

(21) Appl. No.: 10/371,858

(22) Filed: Feb. 20, 2003

(65) Prior Publication Data

US 2004/0163933 A1 Aug. 26, 2004

(51) Int. Cl.[7] ............................................. B65G 27/16
(52) U.S. Cl. ..................... 198/770; 198/762; 198/766; 198/767; 198/771
(58) Field of Search ............................ 198/752.1, 759, 198/760, 762, 761, 763, 766, 767, 770, 771

(56) References Cited

U.S. PATENT DOCUMENTS

| | | | |
|---|---|---|---|
| 2,365,978 A | 12/1944 | Strain | |
| 2,951,581 A | 9/1960 | Long et al. | |
| 3,024,663 A | 3/1962 | Carrier Jr. et al. | |
| 3,089,582 A | 5/1963 | Musschoot et al. | |
| 3,112,653 A | 12/1963 | Morris | |
| 3,203,264 A | 8/1965 | Evans | |
| 3,291,289 A | 12/1966 | Savage | |
| 3,338,384 A | 8/1967 | Carrier Jr. | |
| 3,348,664 A | 10/1967 | Renner | |
| 3,668,939 A | * 6/1972 | Schrader ........................ 74/61 |
| 4,088,223 A | * 5/1978 | Bertrand ...................... 198/761 |
| 4,149,627 A | * 4/1979 | Dumbaugh et al. ......... 198/770 |
| 4,313,535 A | 2/1982 | Carmichael | |
| 4,378,064 A | * 3/1983 | Brown ........................ 198/769 |
| 4,793,196 A | 12/1988 | Davis et al. | |
| 5,054,606 A | * 10/1991 | Musschoot .................. 198/751 |
| 5,265,730 A | * 11/1993 | Norris et al. ............... 209/326 |
| 5,547,068 A | * 8/1996 | Spurlin ....................... 198/760 |
| 5,836,204 A | 11/1998 | Skak | |
| 5,853,082 A | * 12/1998 | Buckley et al. .......... 198/752.1 |
| 6,029,796 A | * 2/2000 | Musschoot .................. 198/753 |
| 6,079,550 A | 6/2000 | Gilman | |
| 6,179,117 B1 | 1/2001 | Gilman | |
| 6,286,658 B1 | * 9/2001 | Hufford ...................... 198/766 |
| 6,308,822 B1 | 10/2001 | Moran et al. | |
| 6,357,579 B1 | * 3/2002 | Patterson et al. ........... 198/766 |
| 6,415,913 B2 | * 7/2002 | Sleppy et al. ............... 198/766 |
| 6,655,523 B2 | * 12/2003 | Jones et al. ................. 198/770 |
| 6,675,955 B2 | * 1/2004 | Nasser-Moghaddassi et al. .......................... 198/769 |

* cited by examiner

Primary Examiner—Douglas Hess
(74) Attorney, Agent, or Firm—Wells St. John P.S.

(57) ABSTRACT

A conveying apparatus is disclosed and which includes a supporting frame; an article transporting bed which is oriented in spaced relation relative to the supporting frame; a plurality of resilient supports mounted on both the supporting frame and the article transporting bed and which supports the article transporting bed in spaced relation relative to the supporting frame; and a drive assembly borne by the supporting frame and which provides an oscillating force having a plurality of components and which causes the article transporting bed to move reciprocally, and wherein the drive assembly amplifies the components of the oscillating force which are at a given angle relative to the resilient supports.

32 Claims, 5 Drawing Sheets

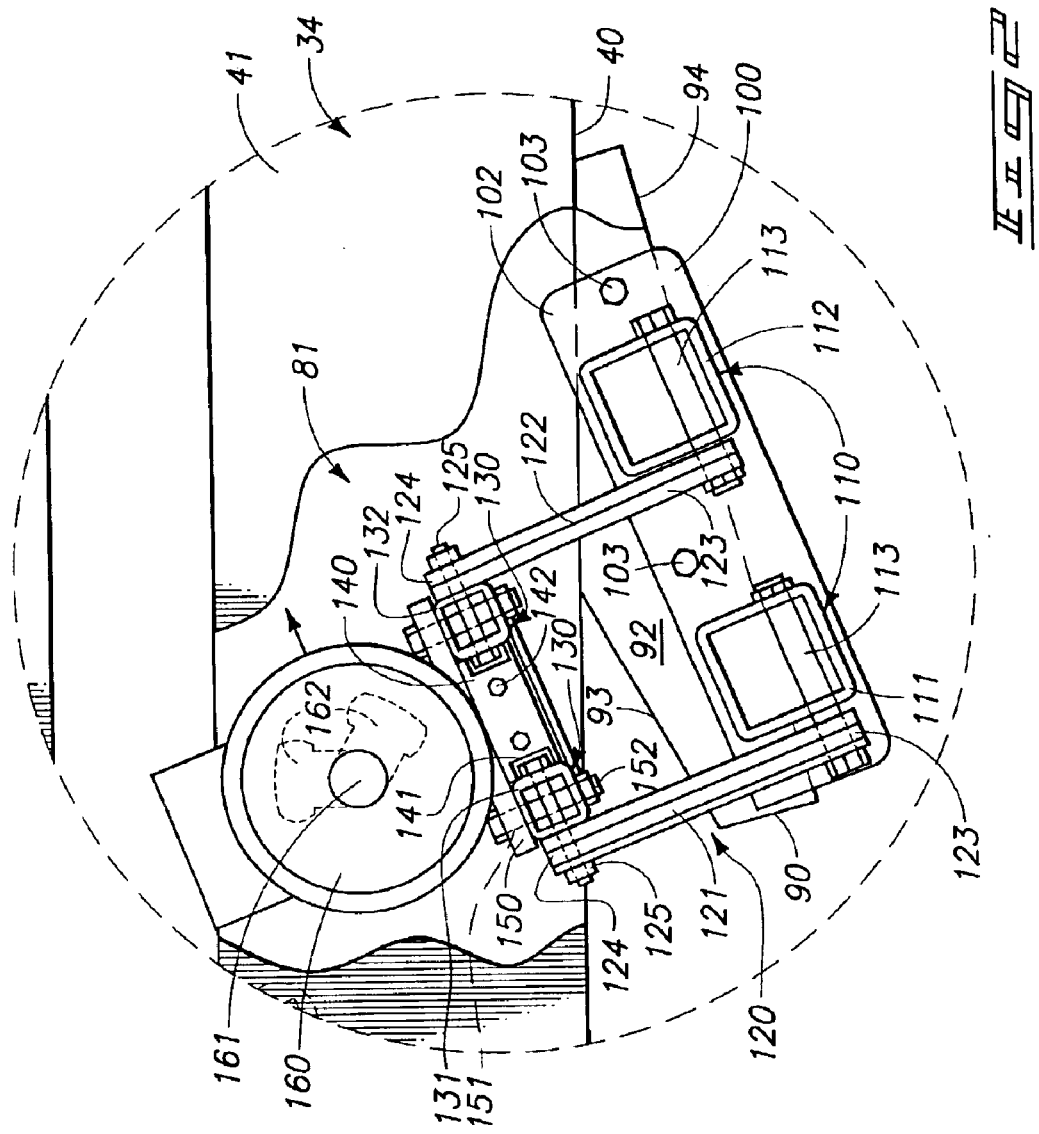

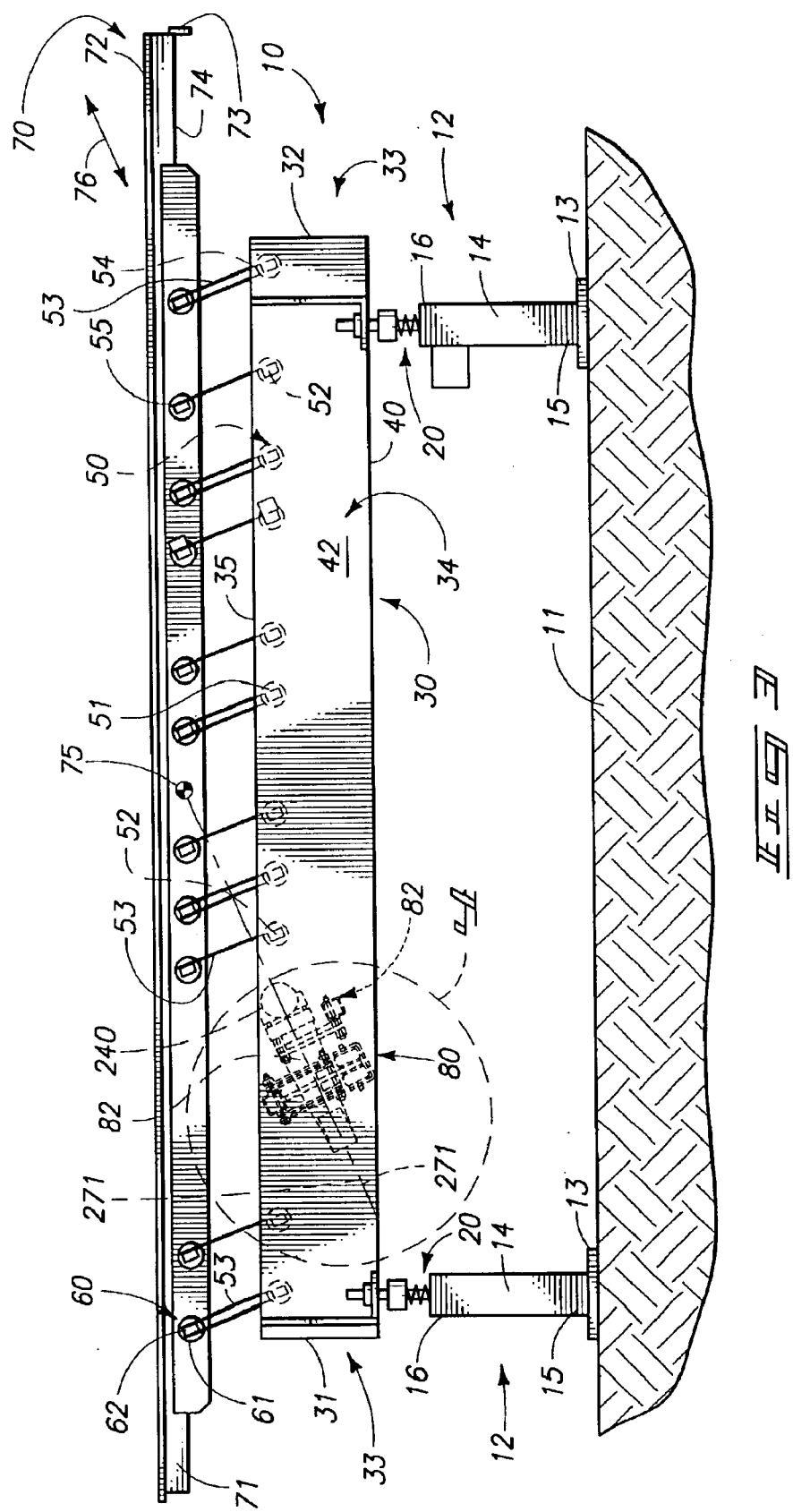

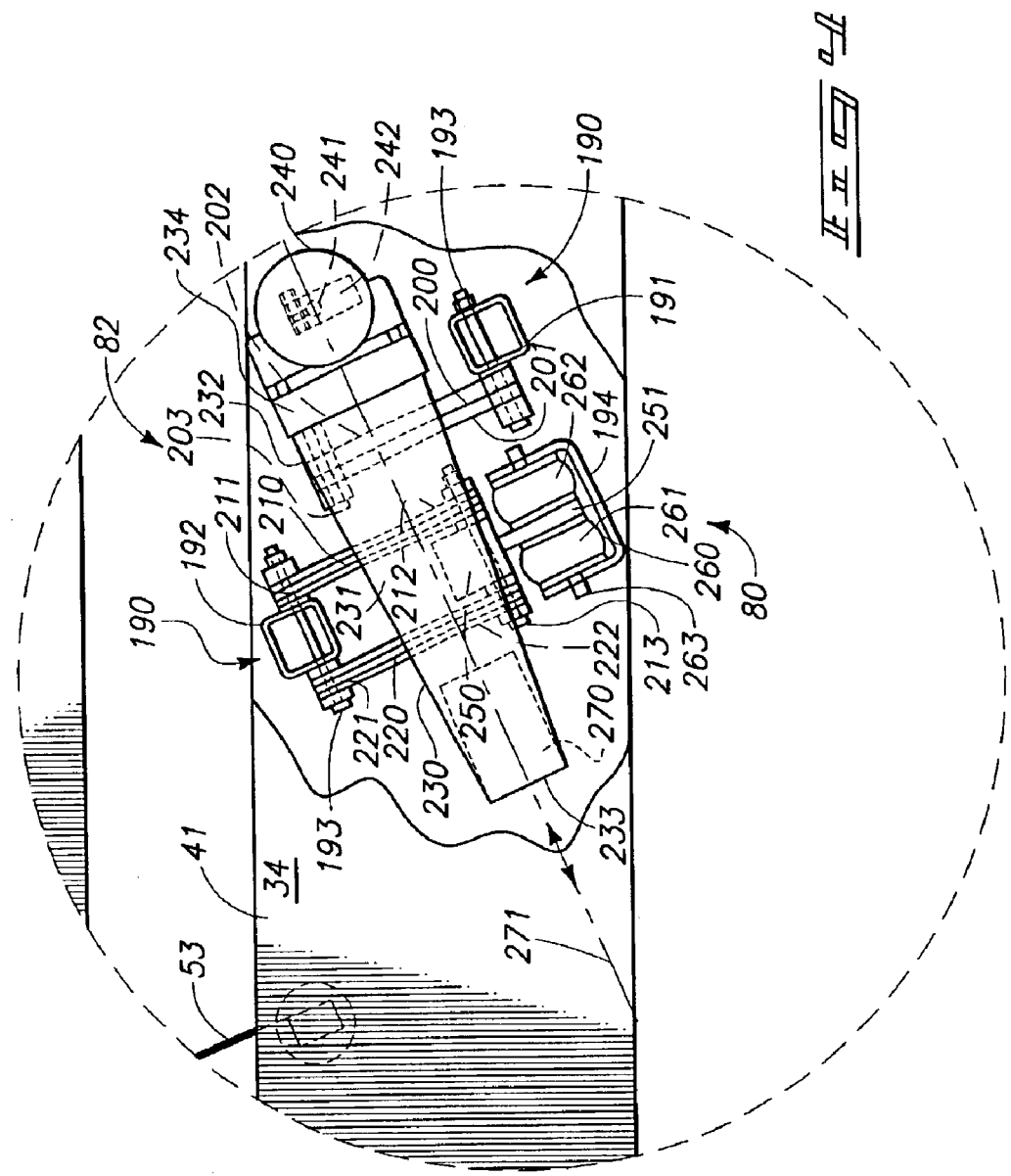

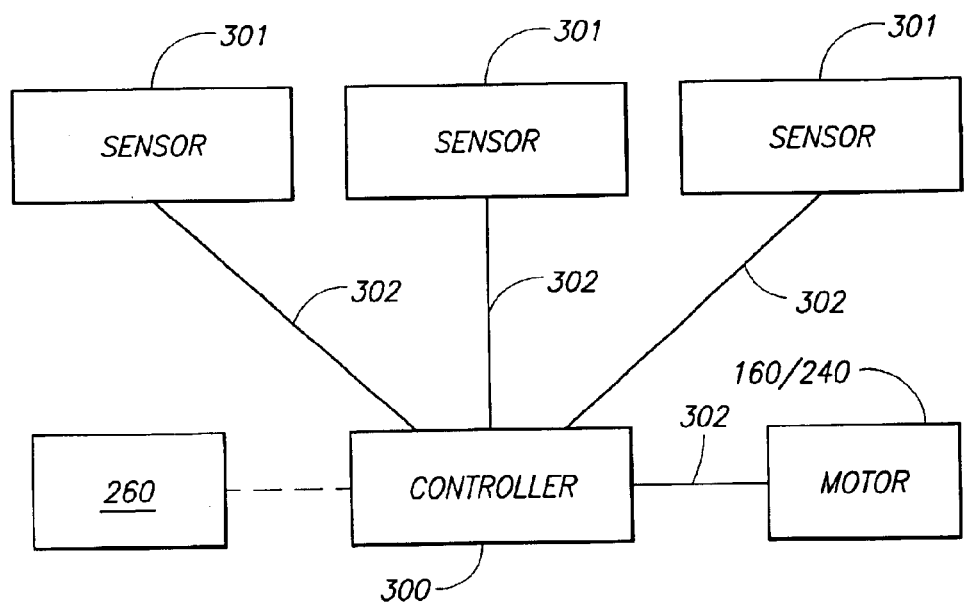

CONVEYING APPARATUS

TECHNICAL FIELD

The present invention relates to a conveying apparatus, and more specifically to an excited frame conveying apparatus having improved drive assemblies.

BACKGROUND OF THE INVENTION

Vibratory conveying systems of various designs are well known in the art. One form of vibratory conveying system is the excited frame conveyor. An example of such a vibratory conveyor is seen in U.S. Pat. No. 4,313,535 to Carmichael and which is incorporated by reference herein. Still further, an excited frame conveyor which has an operational frequency greater than the first natural structural frequency of the frame is disclosed in U.S. patent application Ser. No. 09/810,307. The teachings of this pending application are also incorporated by reference herein.

Excited frame conveyors of these, and other similar designs, have provided many advantages over traditional vibratory conveyors inasmuch as these conveying systems are able to convey product efficiently, while simultaneously not transmitting vibratory force into the supporting surface upon which the conveying system rests or is suspended therefrom. In view of these performance characteristics, these types of conveyors are useful in various commercial environments where traditional vibratory conveyors would not be useful inasmuch as they would transmit too much vibratory energy into the supporting surface thereby potentially causing damage to the supporting surface or to the machine itself or further cannot be fabricated into the desired lengths which are useful in a given commercial environment.

Various control schemes have been devised in order to control the operation of excited frame conveyors. An example of a method of operating such an excited frame conveyor is found in U.S. Pat. No. 6,308,822, the teachings of which are incorporated by reference herein. In this patent, sensors are placed at various locations on the conveying apparatus and are coupled to a control assembly which is configured to monitor movement of various assemblies relative to the frame and determine the operational state of the conveying apparatus.

While these control schemes have operated with some degree of success, other perceived shortcomings have been noted with the prior art practices and assemblies described above. For example, in U.S. Pat. No. 6,079,550 an electromagnetic drive is described and which has a mass that vibrates back and forth along a substantially straight path. This mass is further connected to the frame of an excited frame conveyor and is operated in a fashion to provide, what is reported to be, several advantages relative to prior art drive assemblies employed in excited frame conveyors which utilize counter-rotating weights. In this regard, one of the reported advantages identified in U.S. Pat. No. 6,079,550 is the substantial elimination of transient vibrational motion of the excited frame and conveying member during start-up and shut-down of the conveyor system. It is reported in this patent that during these periods of transition, significant vibrational forces are transferred into the floor or ceiling supports which may result, on occasion, in catastrophic failures such as when a conveyor system becomes dislodged from its supports.

While this arrangement would appear satisfactory, at least on first analysis, this same arrangement is somewhat costly to manufacture and further includes a translating mass weighing several hundred pounds which creates a vibratory force which is transmitted substantially along a straight line, and which is reported to never match the natural frequency of the frame.

A conveying apparatus which avoids the perceived shortcomings and detriments in the prior art apparatuses and practices utilized heretofore is the subject matter of the present patent.

SUMMARY OF THE INVENTION

Therefore, one aspect of the present invention is to provide a conveying apparatus which includes a supporting frame; an article transporting bed which is oriented in spaced relation relative to the supporting frame; a plurality of resilient supports mounted on both the supporting frame and the article transporting bed, and which supports the article transporting bed in spaced relation relative to the supporting frame; and a drive assembly borne by the supporting frame and which provides an oscillating force having a plurality of components and which causes the article transporting bed to move reciprocally, and wherein the drive assembly amplifies the components of the oscillating force which are preferably at a perpendicular angle relative to the resilient supports.

Still another object of the present invention relates to a conveying apparatus having a drive assembly which includes a drive frame; a motor which rotates an eccentric mass to produce the oscillating force and which is mounted on the drive frame; and a moveable drive mass borne by the drive frame and which is influenced by the oscillating force, and wherein the moveable mass has a vibrational resonance as imparted in the preferred form of the invention by at least one resilient member and which, when influenced by the oscillating force, amplifies the oscillating force generated by the motor.

Still another aspect of the present invention relates to a drive assembly which is utilized with a conveying apparatus of the present invention, and which includes a beam spring having opposite first and second ends, and wherein the first end is mounted on the supporting frame, and wherein the beam spring is oriented in substantially parallel, spaced relation relative to the resilient supports mounted on both the supporting frame and the article transporting bed; and a drive motor is mounted on the second end of the beam spring and which rotates an eccentric mass to produce the oscillating force.

Yet another aspect of the present invention relates to a conveying apparatus which includes a supporting frame; an article transporting bed which is oriented in spaced relation relative to the supporting frame; a plurality of beam springs mounted on the supporting frame and extending between the supporting frame and the article transporting bed to moveably support the article transporting bed in spaced relation relative to the supporting frame; a drive assembly borne by the supporting frame and which has a motor which rotates an eccentric mass and which further generates an oscillating force having a plurality of components, and wherein at least one of the components of the oscillating force is directed along a line which passes through the bed, and wherein the drive assembly further has at least one adjustable spring mounted on the drive assembly and which extends between drive assembly and the supporting frame, and wherein the drive assembly causes the article transporting bed to have a variable stroke; and a controller coupled in controlling relation relative to the motor and the adjustable spring and which adjusts the variable stroke of the article transporting bed.

A further aspect of the present invention relates to a conveying apparatus which includes a supporting frame; an article transporting bed which is oriented in spaced relation relative to the supporting frame; a plurality of first beam springs mounted on the supporting frame and extending between the supporting frame and the article transporting bed to moveably support the article transporting bed in spaced relation relative to the supporting frame; a drive assembly mounted on the supporting frame and which has a plurality of second beam springs each having a first end which is mounted on the supporting frame, and an opposite second end, and a variable speed motor mounted on the second end of the second beam springs, and which rotates an eccentric mass to generate an oscillating force which is transmitted along a line of force which passes through the article transporting bed to cause the article transporting bed to reciprocate and have a predetermined stroke; a sensor borne by the conveying apparatus and which is configured to sense the stroke of the article transporting bed and transmit an output signal which substantially reflects the stroke of the article transporting bed; and a controller coupled in signal receiving relation relative to the sensor, and in speed controlling relation relative to the motor, and wherein the controller adjusts the speed of the motor based upon the output signal received from the sensor to substantially inhibit the article transporting bed from exceeding the predetermined stroke.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 2 is a fragmentary, side elevation view of a drive assembly employed with the first embodiment of the invention.

FIG. 3 is a side elevation view of a second embodiment of the present invention.

FIG. 4 is a fragmentary, side elevation view of a drive assembly employed with the second embodiment of the invention.

FIG. 5 is a schematic block diagram showing the relationships of various components of the present invention.

DETAILED DESCRIPTION OF THE PREFERRED EMBODIMENTS

Figure 1:
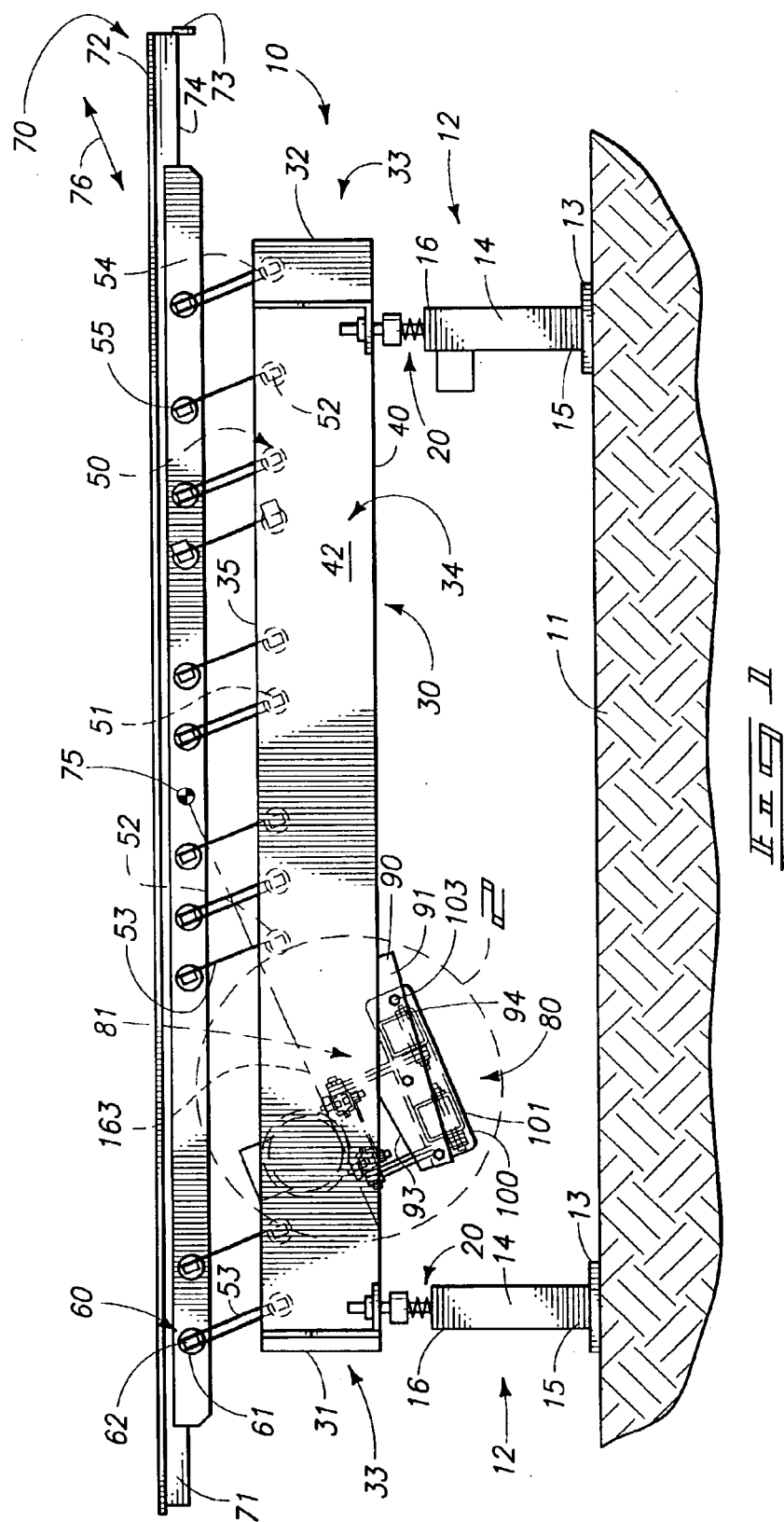
FIG. 1 is a side elevation view of a first embodiment of the present invention.

This disclosure of the invention is submitted in furtherance of the constitutional purposes of the U.S. Patent Laws "to promote the progress of science and useful arts" (Article 1, Section 8).

The conveying assembly of the present invention is generally indicated by the numeral 10 in FIGS. 1 and 3. The present conveying apparatus is an excited frame vibratory conveyor which is shown resting on the surface of the earth 11 by supporting legs which are generally indicated by the numeral 12. The supporting legs include a base member 13 which rests on the surface of the earth and a leg portion 14 which extends substantially normally upwardly a given distance therefrom. The leg portion 14 has a first end 15 which is affixed to the base member 13, and an opposite, distal, or second end 16 which is remote thereto. Mounted on the second end 16 of each of the supporting legs 12 is a vibration isolating spring assembly which is generally indicated by the numeral 20. Affixed to the vibration isolating spring assembly 20, is a substantially rectangular-shaped frame 30. The frame has a first end 31, and an opposite second end 32. The frame includes opposite end portions 33; and opposite side portions 34 which are coupled or affixed to the opposite end portions 33. Each of the side portions 34 have a top edge 35; and a bottom edge 40; an inwardly facing surface 41 (FIG. 2 and 4) and an outwardly facing surface 42. As seen in FIGS. 1, 3 and following, a plurality of lower mounting fixtures 50 are affixed by welding or suitable fasteners to the inside facing surface 41 of each of the opposite side portions 34. These lower mounting fixtures are mounted in predetermined spaced locations along each of the opposite side portions 34. Each of the lower mounting fixtures 50 have a base plate 51 which is affixed to the inside facing surface 41. This can be accomplished by welding or other suitable fasteners as indicated above. Still further, a post 52 is mounted to or otherwise made integral with the base plate 51 and extends substantially normally outwardly therefrom. The post 52 has apertures formed therein (not shown). As seen in FIGS. 1, 3 and following, the conveyor apparatus 10 includes resilient members, or beam springs which are generally indicated by the numeral 53. These beam or leaf springs are well understood in the art and are fabricated from various resilient synthetic materials appropriate for the article transporting bed which is supported by same and which will be discussed in further detail hereinafter.

As seen in the drawings, each of the beam springs 53 have respective first ends 54, and opposite, distal, or second ends 55. As best appreciated by a study of FIGS. 1 and 3, the proximal or first ends 54 are affixed by a pair of fasteners (not shown) which are received through the individual first beam springs 53 and which further pass through the lower mounting fixture 50 by way of the apertures formed in same (not shown). As also seen in FIGS. 1 and 3, the conveyor apparatus 10 also includes upper mounting fixtures 60 which have an overall design which is substantially similar to the lower mounting fixtures 50. The upper mounting fixtures include a base plate 61, and a post 62 which is affixed thereto. In a fashion similar to that previously discussed with respect to the lower mounting fixture 50, apertures (not shown) are formed in the post 62 and suitable fasteners are received through the distal ends 55 of each of the first beam springs 53, thereby securing the distal ends of each of the beam springs 53 to the upper mounting fixture 60. As should be understood, the plurality of resilient members or first beam springs 53, which are borne by the frame, each have a predetermined spring rate and range of motion. This range of motion allows an article transporting bed, which will be discussed hereinafter to repeatedly move once force is imparted to same, in a forward and upward direction to convey products supported thereon from the infeed or first end, to the discharge or second end thereof. As should be understood, vibratory or oscillating motion or energy imparted to the frame 30 is transmitted to the first beam springs 53 which are borne by the frame to cause the beam springs 53 to move within their given range of motion.

As best seen by references to FIGS. 1 and 3, the conveying apparatus 10 of the subject invention includes a conveyor or article transporting bed which is generally indicated by the numeral 70, and which is mounted on or borne by each of the plurality of resilient supports, or first beam springs 53. The article transporting bed 70 is of substantially conventional design and includes a first or infeed end 71, and an opposite, second or discharge end 72. The article transporting bed defines a supporting surface 73, and an opposite bottom surface 74. As will be appreciated, the uppermost surface supports a product which travels therealong to the discharge end for further processing by other equipment (not shown). The article transporting bed has a center of mass 75. Yet further, a drive assembly, as will be discussed below, imparts a vibrational resonance to the article transporting bed 70 and a predetermined stroked 76.

Referring more specifically to FIGS. 1–4, it will be appreciated that the conveying apparatus 10 of the present invention includes a drive assembly 80. The drive assembly 80 includes a first form 81, as seen in FIGS. 1 and 2; and a second form 82 as seen in FIGS. 3 and 4, respectively.

Referring now to FIG. 2, a first form 81 of the drive assembly 80 is shown, and which includes a pair of frame support members 90 which individually extend angularly, downwardly relative to the respective side portions 34 of the rectangular frame 30. Each of the support members 90 includes an outside facing surface 91 (FIG. 1), and an inside facing surface 92 (FIG. 2). Still further, each of the frame support members have an uppermost peripheral edge 93 and a lowermost peripheral edge generally indicated by the numeral 94.

A pair of reinforcing or mounting plates 100 are provided and which each have an outside facing surface 101, which is disposed in juxtaposed relation thereagainst the inside facing surface 92 of the respective frame support members 90; and an opposite, inside facing surface 102. Apertures are formed through the respective frame support members 90, and reinforcing plates 100 and are operable to receive suitable fasteners 103 therethrough and which securely affix the respective reinforcing plates to each of the individual frame support members 90.

A pair of substantially transversely disposed drive frame members are generally indicated by the numeral 110, and which extend between, and are fastened to, the respective reinforcing plates 100. The transversely disposed drive frame members 110 are of substantially identical dimension, and include a first drive frame member 111 and a second drive member 112 which is disposed in predetermined substantially parallel spaced relation relative thereto. As illustrated in FIG. 2, a fastener 113 is received through each of the respective transversely disposed drive frame members 110 and is secured thereto in an appropriate fashion.

Referring still to FIG. 2, a plurality of drive assembly beam or leaf springs 120 are provided. The pair of beam or leaf springs includes a first beam spring 121 which is affixed by way of the fastener 113 to the first drive frame member 111. Still further, a second beam or leaf spring 122 is provided and which is affixed by way of the fastener 113 to the second drive frame member 112. As will be recognized, many more beam or leaf springs may be located along the length of the first and second drive frame members 111, and 112, respectively. Each of the respective drive assembly beam or leaf springs have a first end 123, and an opposite second end 124 which is remote thereto. As depicted in the drawings, a second fastener 125 is received through the second end 124 of the respective first and second leaf or beam springs.

A second pair of transversely disposed frame members 130 are provided and which are individually affixed to the second end 124 of each of the respective drive assembly beam or leaf springs 120. The second pair of frame members 130 includes a first frame member 131, which is mounted on the second end 124 of the first beam or leaf spring 121, and a second frame member 132 which is mounted on the second end 124 of the second beam or leaf spring 122. As seen in FIG. 2, the fastener 125 is received through the respective first and second frame members 131 and 132 and is secured thereto in an appropriate fashion.

The first drive assembly 81 includes a ballast or mass 140 which is positioned or otherwise supported between the first and second transversely disposed drive frame members 131 and 132 respectively. This ballast or mass has a predetermined weight in relative comparison to a drive motor which will be discussed in detail, below. The ballast or mass 140 has a first end 141 which rests in juxtaposed relation relative to the first transversely disposed drive frame member 131, and an opposite, second end which rests against the second transversely disposed drive frame member 132.

Referring still to FIG. 2, it will be seen that a motor mount 150 is provided and which has apertures 151 formed therein. The apertures are operable to receive a fastener 152 therethrough. The fastener 152 is further received through suitable apertures formed in the respective first and second transversely disposed drive frame members 131 and 132. The fasteners 152 secure the motor mount 150 in a fixed location relative to the first and second transversely disposed drive frame members. A variable speed motor 160 is affixed to the motor mount 150 and may be selectively controlled and energized by way of a controller which will be discussed in greater detail hereinafter. The variable speed motor has a drive shaft 161 and an eccentric mass 162 is mounted on the drive shaft and is operably rotated by the motor 160 when it is energized by the controller which will be discussed below. Once energized, the drive motor 160, which is mounted on the second end 124 of the respective second beam or leaf springs 121, 122, rotates the eccentric mass 162 to produce an oscillating force having a plurality of components. This oscillating force having the selective components is transmitted along a line of force 163 and which passes through the article transporting bed 70, and at an angle which is substantially perpendicular to the respective resilient members or first beam springs 53 which support the article transporting bed 70 in predetermined substantially parallel spaced relation relative to the rectangular frame 30. As illustrated in FIG. 1, it will be appreciated that the line of force 163 passes substantially through the center of mass 75 of the overlying article transporting bed 70. While this is a preferred form of practicing the invention, those skilled in the art will recognize that it is not necessary for the line of force to extend substantially through the center of mass, but it may be offset from the center of mass by a short distance.

Referring now to FIGS. 3 and 4, the second form 82 of the drive assembly 80 is illustrated therein and includes a pair of substantially transversely disposed drive frame members 190 and which extend between the side portions 34 of the substantially rectangular frame 30. The pair of transversely disposed drive frame members 190 are attached to the side portions 34 by welding, fasteners or the like. The pair of transversely disposed drive frame members 190 includes a first or lower frame member 191, and a second or upper frame member 192. Fasteners 193 are provided, and which extend through the respective first and second frame members 191 and 192 as illustrated. In addition to the first and second frame members, a mounting fixture 194 is provided and which extends between the respective side portions 34. The mounting fixture 194 is operable to position a variable rate spring, here illustrated as an air spring, in an appropriate orientation relative to the drive assembly 82. This adjustable spring will be discussed in greater detail hereinafter.

The second form 82 of the drive assembly 80 has a first drive spring 200 as illustrated. The drive spring 200 has a first end 201 which is affixed by means of the fastener 193 to the first or lower frame member 191, and an opposite second end 202 which is remote thereto. As illustrated, a fastener 203 is received through the second end 202. Still further, the second form 82 of the drive assembly 80 includes a second drive spring which is generally indicated by the numeral 210. As will be seen, the second drive spring 210 is disposed in substantially parallel, predetermined, spaced relation relative to the first drive spring 200. Yet further, it will be recognized that the first and second drive springs 200 and 210 are disposed in substantially parallel spaced relation relative to the respective first beam springs or resilient member 53, only one of which is partially shown in FIG. 4. The second drive spring 210 has a first end 211 which is mounted on the upper or second frame member 192 by the fastener 193, and an opposite, second end 212 which is remote thereto. As illustrated in FIG. 4, a fastener 213 is received through the second end 212 of the second drive spring 210. Mounted in predetermined spaced relation, and on the opposite side of the second or upper frame member 192, is a third drive spring which is generally indicated by the numeral 220. The third drive spring 220 has a first end 221 which is mounted to the upper frame member 192 by way of the fastener 193 as illustrated. Still further, the third drive spring 220 has a second end 222 which has an aperture formed therein and which is operable to receive the fastener 213 therethrough.

Referring still to FIG. 4, it will be seen that the second form 82 of the drive assembly 80 includes a drive frame which is generally indicated by the numeral 230. The drive frame comprises, among other assemblies, a pair of elongated support members 231. The elongated support members are mounted in predetermined spaced relation one to the other. Each of the elongated members 231 has a first end 232, and an opposite second end 233. As will be recognized from the drawings, a motor mount 234 is mounted on the first end 232 of each of the respective elongated members 231. This motor mount, in part, maintains the respective elongated members in predetermined spaced relation one to the other. A variable speed motor of conventional design 240 is mounted using conventional fasteners to the motor mount 234. The variable speed motor 240 includes a rotatable drive shaft 241, which rotates when energized by a controller which will be discussed in greater detail hereinafter. As illustrated, an eccentric rotatable mass 242 is mounted on the drive shaft. When energized, the electric motor is operable to rotate the eccentric mass thereby producing an oscillating force having a plurality of components and which is transmitted to the drive frame 230. It will be seen that the fastener 203 which passes through the second end 202, of the first drive spring 200 passes through the motor mount 234 thereby fastening the first drive spring to same. It will further be recognized that the first drive spring 200 is mounted at a location which is juxtaposed or adjacent to the first end 232 of the drive frame 230.

Referring still to FIG. 4, the drive frame 230 includes a drive frame cross member 250 which extends between the pair of elongated members 231 and which is shown in phantom lines in FIG. 4. The second and third drive springs 210 and 220, respectively and more specifically the second ends thereof 212 and 222 are fastened to the drive frame cross member 250 by way of the fastener 213 which is received therethrough. Affixed to the drive frame cross member and extending outwardly and downwardly from the drive frame cross member 250 is an engagement member 251. Mounted in the mounting fixture 194 is an adjustable spring 260. The spring as illustrated is a pneumatic or air spring 260. The air spring 260 includes a first portion 261 and a second, or opposite portion 262. The engagement member 251 is received between the first and second portions 261 and 262. By varying the relative air pressure in the respective portions, the spring 260 readily becomes adjustable, and provides a means for fine-tuning the vibrational resonance rate of the drive assembly 82. This will be discussed briefly hereinafter. A fastener 263 is operable to secure the first and second portions 261 and 262 of the adjustable spring 260 in the mounting fixture 194.

A drive mass 270 is mounted on the second end 233 of the drive frame 230. The drive mass is operable to reciprocate or otherwise oscillate along a substantially or linear path of travel in order to create a line of force 271 which passes substantially through the center of mass 75 of the article transporting bed 70. As with the first form of the drive assembly 81, it will be recognized that this line of force 271 may be displaced a predetermined distance from the center of mass while still substantially achieving the benefits of the present invention. As seen in FIG. 4, the drive mass 270 is disposed in spaced relation relative to the motor 240. When the motor 240 is energized and produces the oscillating force, this same force imparts a reciprocal movement to the drive frame 230 and the attached drive mass 270. The reciprocal movement of the drive frame and drive mass produces a resonance rate which is imparted by the drive springs 200, 210 and 220 and the variable rate spring 260. It is this resonance rate and the oscillating force which imparts reciprocal motion, represented by a predetermined stroke 76 to article transporting bed 70. Still further, the adjustable spring 260 which is mounted on the mounting fixture 194 can variably adjust the force generated by the motor 240, and thereby adjust the stroke 75 of the article transporting bed. Therefore, the stroke of bed 76 may singularly or simultaneously be adjusted by controlling the speed of the motor 240, or by adjusting the variable rate spring 260.

Referring now to FIG. 5, it will be seen from this schematic diagram that a controller 300 of conventional design is provided and which is coupled in speed controlling relation relative to the motor(s) 160 and 240. As will be further recognized, a plurality of sensors 301 are borne by the conveying apparatus 10 in order to provide output signals reflecting the operational condition of the conveying apparatus. In this regard, the oscillating force imparted by the motor 160 or 240 upon rotation of the eccentric mass 162 or 242 causes the article transporting bed 70 to have a predetermined stroke 76, that is, a reciprocal path of movement where the bed moves generally from a position of rest forward and upwardly, and then rearwardly and downwardly in a repeated cycle which moves product from the first end 71 to the second end 72. Each of the respective sensors 301 are configured to sense aspects of the stroke 76 such as vibrational amplitude, phase, etc., and provide an output signal when the predetermined stroke 76 is exceeded. When received, the output signals of the respective sensors causes the controller 300 to decrease the speed of the motor 240 to substantially prohibit the article transporting bed 70 from exceeding the predetermined stroke and/or adjust the spring 260. As seen in FIG. 5, the respective sensors 301 are coupled to the controller by a plurality of electrical pathways 302. The controller may be controlled from a remote location. Still further, the controller may provide output data to a user at a remote location to indicate the performance of the conveyor apparatus 10 of the present invention. Yet further, it will be seen that in one form of the invention that the controller 300 would be coupled in controlling relation relative to the variably adjustable spring 260 so as to control the resonance rate of the drive assembly 80.

Operation

The operation of the described embodiments of the present invention are believed to be readily apparent and are briefly summarized at this point.

Referring more particularly to FIGS. 1, 2, 3 and 4, a conveying apparatus 10 of the present invention includes a supporting frame 30. An article transporting bed 70 is provided and which is oriented in spaced relation relative to the supporting frame. Additionally, the conveying apparatus 10 includes a plurality of resilient support members 53 mounted on both the supporting frame 30 and the article transporting bed 70 and which supports the article transporting bed in spaced relation relative to the supporting frame. Still further, the conveying apparatus 10 includes a drive assembly 80 which is borne by the supporting frame, and which provides an oscillating force having a plurality of components and which causes the article transporting bed 70 to move reciprocally. The drive assembly 80 amplifies the components of the oscillating force which are at a given angle relative to the resilient supports.

Referring now to FIG. 2, a first form 81 of the drive assembly 80 is shown and which includes a beam spring 121 or 122 having opposite first and second ends. As seen, a first end 123 is mounted on the supporting frame 30. The beam spring 121 and/or 122 is oriented in substantially parallel spaced relation relative to the resilient supports 53 which are mounted on both the supporting frame 30 and the article transporting bed 70. Still further, in the first form of the drive assembly 81, a drive motor 160 is mounted on the second end 124 of the beam springs 121 and 122 and rotates, when energized, an eccentric mass 162 to produce the oscillating force. In the arrangement as shown in FIG. 2, the first form of the drive assembly 81 includes a ballast or mass 140 which is mounted on the second end of the respective beam or leaf springs 121 and 122. The motor 160 has a first weight and the mass has a second weight which is less than the first weight. In an alternative arrangement, the motor may have a first mass and the second mass has a second weight which is greater than the first weight.

More specifically, the conveying apparatus 10 of the present invention includes a supporting frame 30; and an article transporting bed 70 which is oriented in spaced relation relative to the supporting frame 30. A plurality of first beam springs 53 are mounted on the supporting frame 30 and extend between the supporting frame 30 and the article transporting bed 70 to moveably support the article transporting bed in spaced relation relative to the supporting frame 30. A drive assembly 82 is mounted on the supporting frame 30 and which has a pair of second beam springs 121 and 122 each having a first end 123 and an opposite second end 124. A variable speed motor 160 is provided and which is mounted on the second end 124 of the second beam springs 121 and 122, respectively. As earlier discussed, the motor 160 rotates an eccentric mass 162 to generate an oscillating force which is transmitted along a line of force 163 which passes through the article transporting bed 70 to cause the article transporting bed to reciprocate and have a predetermined stroke 76. A sensor 301 is borne by the conveying apparatus 10 and which is configured to sense the stroke 76 of the article transporting bed 70 and transmit an output signal which substantially reflects the stroke of the article transporting bed 70. Further, a controller 300 is coupled in signal receiving relation relative to the sensor 301 and in speed controlling relation relative to the motor 160. The controller 300 adjusts the speed of the motor based upon the output signal received from the sensor 301 to substantially prevent the article transporting bed 70 from exceeding the predetermined stroke 76. In the arrangement as shown in FIG. 2, the controller 300 increases or decreases the speed of the motor 160 in substantially equal increments.

Referring now to FIGS. 3 and 4, the second form 82 of the drive assembly 80 includes, as a general matter, a drive frame 230; and a variable speed motor 240 which rotates an eccentric mass 242 to produce an oscillating force having a plurality of components. The motor 240 is mounted on the drive frame 230. In addition to the foregoing, the second form 82 of the drive assembly 80 includes a moveable drive mass 270 which is borne by the drive frame 230, and which is influenced by the oscillating force generated by the motor rotating the eccentric mass 242. The drive frame 230, and the moveable mass 270 has a vibrational resonance when influenced by the oscillating force, and which is utilized to amplify the oscillating force generated by the motor thereby causing the article transporting bed 70 to have the predetermined stroke 76. In addition to the foregoing, the second form 82 of the drive assembly 80 includes an adjustable spring 260 which is mounted on both the drive frame 230, and on the supporting frame 30 and which influences the moveable mass 270. In the arrangement as shown in FIGS. 3 and 4, the motor 240, upon rotation of the eccentric mass 242 creates an oscillating force, having a plurality of components, and a magnitude, and wherein the adjustable spring 260 has a variable vibrational resonance rate and is operable to control the magnitude of the oscillating force.

More specifically, the conveying apparatus 10 of the present invention includes a supporting frame 30, and an article transporting bed 70 which is oriented in spaced relation relative to the supporting frame 30. Still further, a plurality of beam springs 53 are mounted on the supporting frame 30 and extend between the supporting frame 30, and the article transporting bed 70 to moveably support the article transporting bed 70 in spaced relation relative to the supporting frame 30. A drive frame 230 is moveably borne by the supporting frame 30 and has opposite first and second ends 232 and 233, respectively. A motor 240 is mounted on the first end 232 and which has a variable speed of operation, and which further rotates an eccentric mass 242 to generate an oscillating force having a plurality of components, an amplitude and a frequency. A drive mass 270 is mounted on the second end 233 of the drive frame 230, and is disposed in spaced relation relative to the variable speed motor 240. The drive assembly 82 amplifies particular components of the oscillating force provided by the motor 240. The amplified force generated by the motor 240 imparts a vibrational resonance to the article transporting bed 70. As seen in FIGS. 3 and 4, an adjustable spring 260 is provided and which is mounted on the supporting frame 30, and which extends to the drive frame 230 and which operates to variably adjust the force generated by the motor 240.

In the arrangement as seen in FIGS. 3 and 4, the drive assembly 82 amplifies those components of the oscillating force generated by the motor 240 and which are directed along a line of force 271 which is oriented in substantially perpendicular relation to the respective beam springs 53, and which passes substantially through the center of mass 75 of the article transporting bed 70. As should be understood, the article transporting bed 70, and the plurality of beam springs 53 have a combined resonance point and the amplified force has a maximum value which substantially approximates the combined resonance point of the article transporting bed 70 and the plurality of beam springs 53. In the arrangement as seen in FIGS. 3 and 4, the stroke 76 of the article transporting bed 70 is adjusted by controlling the speed of operation of the motor 240 and/or varying the spring rate of the variable spring 260. As earlier discussed, the sensors 300 which are affixed to the conveying apparatus 10 in various locations is operable to allow a controller 300 to maintain the article transporting bed 70 within the predetermined stroke 76 as determined by its design.

Thus the present invention 10 provides a conveyor apparatus which addresses many of the perceived shortcomings in the prior art designs and practices which have been utilized heretofore, and which further provides a drive assembly which is reliable, easy to manufacture, and is less costly than the prior art alternatives or solutions which have been proposed or which have been developed heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A conveying apparatus comprising:
   a supporting frame:
   an article transporting bed which is oriented in spaced relation relative to the supporting frame;
   a first sensor borne by the article transporting bed;
   a second sensor borne by the supporting frame;
   a plurality of resilient supports mounted on both the supporting frame and the article transporting bed and which supports the article transporting bed in spaced relation relative to the supporting frame;
   a drive frame borne by the supporting frame;
   a third sensor borne by the drive frame, and wherein the first, second and third sensors each provide an output signal;
   a motor mounted on the device frame, and which rotates an eccentric mass to produce an oscillating force having a plurality of components;
   a moveable drive mass borne by the drive frame and which is influenced by the oscillating force;
   a spring mounted on both the drive frame, and on the supporting frame, and which influences the moveable drive mass, and wherein the spring has a variable spring rate, and wherein the plurality of components of the oscillating force which are at a given angle relative to the resilient supports may be controllably amplified by varying the spring rate of the spring; and
   a controller coupled in signal receiving relation relative to the output signals of each of the first, second and third sensors, and further coupled in speed controlling relation relative to the motor, and wherein the controller receives and utilizes the output signals of the respective sensors to determine a vibrational phase and amplitude of the article transporting bed relative to the supporting frame, and wherein the controller adjusts the speed of operation of the motor to substantially maintain the vibrational amplitude within a predetermined range.

2. A conveying apparatus comprising:
   a supporting frame;
   an article transporting bed which is oriented in spaced relation relative to the supporting frame;
   a plurality of resilient supports mounted on both the supporting frame and the article transporting bed, and which supports the article transporting bed in spaced relation relative to the supporting frame;
   a beam spring having opposite first and second ends, and wherein the first end is mounted on the supporting frame, and wherein the beam spring is oriented in substantially parallel spaced relation relative to the resilient supports mounted on both the supporting frame and the article transporting bed;
   a drive motor mounted on the second end of the beam spring and which rotates an eccentric mass to produce an oscillating force having a plurality of components; and
   a second mass mounted on the second end of the beam spring, and wherein the motor has a first weight, and the second mass has a second weight which is substantially equal to or less than the first weight, and wherein the components of the oscillating force which are oriented at a given angle relative to resilient supports are amplified to cause the article transporting bed to move reciprocally.

3. A conveying apparatus as claimed in claim 2, and wherein the motor has a first weight, and the second mass has a second weight which is substantially equal to or greater than the first weight.

4. A conveying apparatus as claimed in claim 2, and wherein the conveying apparatus has a desired speed of operation, and the article transporting bed has a predetermined weight and stroke, and wherein the motor, second mass, and rotating eccentric weight have a cumulative weight which is correlated to the desired speed of operation, stroke, and weight of the article transporting bed.

5. A conveying apparatus as claimed in claim 2, and wherein the beam spring comprises a pair of beam springs which are oriented in predetermined, spaced, substantially parallel relation, one relative to the other.

6. A conveying apparatus as claimed in claim 2, and further comprising:
   a motor controller coupled in speed controlling relation relative to the motor, and wherein the oscillating force causes the article transporting bed to have a predetermined stroke, and wherein the controller controls the speed of operation of the motor to substantially prohibit the article transporting bed from exceeding the predetermined stroke.

7. A conveying apparatus as claimed in claim 2, and further comprising:
   a sensor borne by the article transporting bed and which provides an output signal; and
   a motor controller coupled in signal receiving relation relative to the sensor, and in speed controlling relation relative to the motor, and wherein the oscillating force causes the article transporting bed to have a predetermined stroke, and wherein the sensor is configured to sense the stroke, and provide an output signal when the predetermined stroke is exceeded, and wherein the output signal causes the controller to decrease the speed of the motor to substantially prohibit the article transporting bed from exceeding the predetermined stroke.

8. A conveying apparatus as claimed in claim 7, and wherein the controller increases or decreases the speed of motor in predetermined increments.

9. A conveying apparatus, comprising:
a supporting frame;
an article transporting bed which is oriented in spaced relation relative to the supporting frame;
a plurality of beam springs mounted on the supporting frame and extending between the supporting frame and the article transporting bed to moveably support the article transporting bed in spaced relation relative to the supporting frame;
a drive assembly borne by the supporting frame and which has a motor which rotates an eccentric mass and which further generates an oscillating force having a plurality of components, and wherein at least one of the components of the oscillating force is directed along a line which passes through the bed, and wherein the drive assembly further has at least one adjustable spring mounted on the drive assembly and which extends between drive assembly and the supporting frame, and wherein the drive assembly causes the article transporting bed to have a variable stroke; and
a controller coupled in controlling relation relative to the motor and the adjustable spring and which adjusts the variable stroke of the article transporting bed.

10. A conveying apparatus as claimed in claim 9, and wherein the drive assembly amplifies the components of the oscillating force which are at a substantially perpendicular angle relative to the respective beam springs.

11. A conveying apparatus as claimed in claim 9, and wherein the line passes substantially through the center of mass of the article transporting bed.

12. A conveying apparatus as claimed in claim 9, and wherein the article transporting bed and the plurality of beam springs, in combination, have a vibrational resonance point, and wherein the drive assembly has a force output which approximates the vibrational resonance point.

13. A conveying apparatus as claimed in claim 9, and wherein the motor has a variable speed of operation, and the controller changes the speed of operation of the motor to adjust the stroke of the article transporting bed.

14. A conveying apparatus as claimed in claim 9, and wherein the adjustable spring has a variable spring rate, and the controller changes the variable spring rate of the adjustable spring to adjust the stroke of the article transporting bed.

15. A conveying apparatus as claimed in claim 9, and wherein the motor has a variable speed of operation, and the adjustable spring has a variable spring rate, and wherein the controller changes the speed of operation of the motor, and the variable spring rate of the adjustable spring to adjust the stroke of the article transporting bed.

16. A conveying apparatus as claimed in claim 9, and wherein the drive assembly comprises:
a drive frame having opposite first and second ends, and wherein the motor is mounted on the first end of the drive frame; and
a drive mass mounted on the second end of the drive frame, and wherein the motor is disposed in spaced relation relative to the drive mass, and wherein the adjustable spring is mounted on the drive frame at a location intermediate the first and second ends of the drive frame, and is further mounted on the supporting frame.

17. A conveying apparatus as claimed in claim 9, and further comprising:
a plurality of sensors borne by the conveying apparatus and electrically coupled to the controller, and which sense the vibrational condition of the supporting frame, article transporting bed and the drive assembly, and wherein the motor has a variable speed of operation, and wherein the controller, based upon an input provided by the respective sensors controllably adjusts the speed of operation of the motor.

18. A conveying apparatus comprising:
a supporting frame;
an article transporting bed which is oriented in spaced relation relative to the supporting frame;
a plurality of first beam springs mounted on the supporting frame and extending between the supporting frame and the article transporting bed to moveably support the article transporting bed in spaced relation relative to the supporting frame;
a drive assembly mounted on the supporting frame and which has a plurality of second beam springs each having a first end which is mounted on the supporting frame, and an opposite second end, and a variable speed motor mounted on the second end of the second beam springs;
a second mass mounted on the second end of the second beam springs, and wherein the motor has a first weight, and the second mass has a second weight, and wherein the preponderance of the combined weight of the motor and the second mass is attributable to the motor, and wherein the motor rotates an eccentric mass to generate an oscillating force which is transmitted along a line of force which passes through the article transporting bed to cause the article transporting bed to reciprocate and have a predetermined stroke;
a sensor borne by the conveying apparatus and which is configured to sense the stroke of the article transporting bed and transmit an output signal which substantially reflects the stroke of the article transporting bed; and
a controller coupled in signal receiving relation relative to the sensor, and in speed controlling relation relative to the motor, and wherein the controller adjusts the speed of the motor based upon the output signal received from the sensor to substantially inhibit the article transporting bed from exceeding the predetermined stroke.

19. A conveying assembly as claimed in claim 18, and wherein the controller increases or decreases the speed on the motor in predetermined substantially equal increments.

20. A conveying apparatus, comprising:
a supporting frame;
an article transporting bed which is oriented in spaced relation relative to the supporting frame;
a plurality of beam springs mounted on the supporting frame and extending between the supporting frame and the article transporting bed to moveably support the article transporting bed in spaced relation relative to the supporting frame;
a drive frame moveably borne by the supporting frame and having opposite first and second ends;
a motor mounted on the first end of the drive frame and which has a variable speed of operation, and which further rotates an eccentric mass to generate an oscillating force having a plurality of components, an amplitude, and a frequency;
a drive mass mounted on the second end of the drive frame, and disposed in spaced relation relative to the motor, and wherein the oscillating force imparts reciprocal movement to the drive frame and drive mass, and wherein the reciprocal movement of the drive frame and drive mass has a resonance which amplifies the oscillating force, and wherein the amplified oscillating force imparts a vibrational resonance to the article transporting bed; and an adjustable spring mounted on the supporting frame and extending to the drive frame and which operates to variably adjust the oscillating force generated by the motor.

21. A conveying apparatus as claimed in claim 20, and further comprising:

a controller operably coupled to the motor and the adjustable spring; and a plurality of sensors borne by the conveying apparatus and operably coupled with the controller, and which are configured to generate individual output signals which are received by the controller and which represent a vibrational amplitude rate of the supporting frame, article transporting bed, and the drive mass, and wherein the controller varies the response of the adjustable spring and/or changes the speed of operation of the motor to vary the force generated by the motor.

22. A conveying apparatus as claimed in claim 20, and further comprising:

a controller operably coupled to the motor and which adjusts the frequency of the force generated by the motor.

23. A conveying apparatus as claimed in claim 20, and wherein the resonance of the drive mass and drive frame amplifies those components of the oscillating force which are directed along a line which is oriented in substantially perpendicular relation relative to the respective beam springs.

24. A conveying apparatus as claimed in claim 20, and wherein the resonance of the drive mass and the drive frame amplifies those components of the oscillating force which are directed along a line which passes substantially through the center of mass of the article transporting bed and which is further substantially perpendicularly oriented relative to the respective beam springs.

25. A conveying apparatus as claimed in claim 20, and wherein the article transporting bed and the plurality of beam springs have a combined resonance point, and wherein the amplified oscillating force generated by the motor, and the drive mass, has a maximum value which substantially approximates the combined resonance point of the article transporting bed and the plurality of beam springs.

26. A conveying apparatus as claimed in claim 20, and wherein the adjustable spring has a variable spring rate, and wherein the amplification of the oscillating force generated by the motor has a magnitude which is controlled by varying the spring rate of the adjustable spring.

27. A conveying assembly as claimed in claim 20, and wherein the adjustable spring has a variable spring rate, and wherein the amplified oscillating force has the effect of causing the article transporting bed to move reciprocally, and wherein the reciprocal motion of the article transporting bed is characterized by a stroke which is adjusted by controlling the speed of operation of the motor, and/or varying the spring rate of the variable spring.

28. A conveying apparatus, comprising:

a supporting frame;

an article transporting bed which is oriented in spaced relation relative to the supporting frame;

a plurality of first beam springs mounted on the supporting frame and extending to the article transporting bed, and which moveably support the article transporting bed in spaced relation relative to the supporting frame;

a plurality of second leaf springs each having a first end which is mounted on the supporting frame, and a distal second end, and wherein the second plurality of leaf springs are disposed in spaced relation, one relative to the other, and further the second plurality of leaf springs are oriented in substantially parallel spaced relation relative to the plurality of first beam springs;

a drive mass borne on the second end of second beam springs and which has first weight;

a drive motor juxtaposed relative to the drive mass and mounted on the second end of the second beam springs;

an eccentric mass rotatably mounted on the motor and which generates an oscillating force which is directed along a line of force which passes through the article transporting bed, and wherein the oscillating force causes the article transporting bed to move reciprocally, and have a predetermined stroke;

a plurality of sensors borne by the conveying apparatus and which are configured to generate individual output signals which represent a vibrational resonance rate of the supporting frame, article transporting bed, and the drive motor; and a controller coupled in signal receiving relation relative to the sensors and in speed controlling relation relative to the motor, and wherein the controller adjustably controls the speed of the motor to substantially prevent the article transporting bed from exceeding the predetermined stroke.

29. A conveying apparatus as claimed in claim 28, and wherein the article transporting bed has a center of mass, and wherein the line of force passes substantially through the center of mass of the article transporting bed.

30. A conveying apparatus as claimed in claim 29, and wherein the line of force is oriented in substantially perpendicular relation relative to the orientation of the plurality of first beam springs.

31. A conveying apparatus as claimed in claim 30, and wherein the article transporting bed, and the plurality of first beam springs have a combined vibrational resonance point, and wherein the oscillating force generated by the motor, and which is directed along the line of force has a maximum value which approximates the combined resonance point.

32. A conveying apparatus as claimed in claim 31, and wherein the controller increases or decreases the speed of the motor in substantially equal predetermined increments.

* * * * *